US012670895B2

(12) United States Patent
Prenger et al.

(10) Patent No.: US 12,670,895 B2
(45) Date of Patent: Jun. 30, 2026

(54) INVERTIBLE NEURAL NETWORK TO SYNTHESIZE AUDIO SIGNALS

(71) Applicant: NVIDIA Corporation, Santa Clara, CA (US)

(72) Inventors: Ryan Prenger, Livermore, CA (US); Rafael Valle, Sunnyvale, CA (US); Bryan Catanzaro, Sunnyvale, CA (US)

(73) Assignee: NVIDIA Corporation, Santa Clara, CA (US)

( * ) Notice: Subject to any disclaimer, the term of this patent is extended or adjusted under 35 U.S.C. 154(b) by 401 days.

(21) Appl. No.: 16/439,569

(22) Filed: Jun. 12, 2019

(65) Prior Publication Data

US 2020/0394994 A1 Dec. 17, 2020

(51) Int. Cl.
*G10L 13/047* (2013.01)
*G06N 3/045* (2023.01)
*G06N 3/047* (2023.01)

(52) U.S. Cl.
CPC ............ *G10L 13/047* (2013.01); *G06N 3/045* (2023.01); *G06N 3/047* (2023.01)

(58) Field of Classification Search
CPC ... G10L 13/047; G06N 3/0454; G06N 3/0472
See application file for complete search history.

(56) References Cited

U.S. PATENT DOCUMENTS

| | | | | |
|---|---|---|---|---|
| 7,254,538 B1 * | 8/2007 | Hermansky | ........... | G10L 15/144 704/E15.036 |
| 11,631,399 B2 * | 4/2023 | Li | ........... | G06N 3/045 706/20 |
| 2018/0018553 A1 * | 1/2018 | Bach | ........... | G06F 40/279 |
| 2019/0156837 A1 * | 5/2019 | Park | ........... | G10L 17/18 |
| 2019/0304480 A1 * | 10/2019 | Narayanan | ........... | G10L 13/02 |
| 2019/0355347 A1 * | 11/2019 | Arik | ........... | G06N 20/20 |
| 2020/0035247 A1 * | 1/2020 | Boyadjiev | ........... | G06F 21/32 |
| 2020/0066260 A1 * | 2/2020 | Hayakawa | ........... | G10L 15/22 |
| 2020/0074985 A1 * | 3/2020 | Clark | ........... | G10L 25/18 |
| 2020/0111496 A1 * | 4/2020 | Itakura | ........... | G06N 3/04 |
| 2020/0372361 A1 * | 11/2020 | Ehteshami Bejnordi | ........... | G06N 3/084 |
| 2020/0388267 A1 * | 12/2020 | Bastyr | ........... | G10K 11/17837 |
| 2021/0375248 A1 * | 12/2021 | Bonada | ........... | G06N 20/00 |
| 2022/0076691 A1 * | 3/2022 | Hiroya | ........... | G10L 21/0272 |
| 2022/0093104 A1 * | 3/2022 | Sharifi | ........... | H04L 65/80 |
| 2022/0208198 A1 * | 6/2022 | Chang | ........... | G10L 17/04 |

OTHER PUBLICATIONS

IEEE Computer Society, "IEEE Standard 754-2008 (Revision of IEEE Standard 754-1985): IEEE Standard for Floating-Point Arithmetic," The Institute of Electrical and Electronics Engineers, Inc., Aug. 29, 2008, 70 pages.

(Continued)

*Primary Examiner* — Bryan S Blankenagel
(74) *Attorney, Agent, or Firm* — Davis Wright Tremaine LLP

(57) ABSTRACT

Systems and methods to help synthesize a second audio signal based, at least in part, on one or more neural networks trained using one or more characteristics of a first audio signal. Systems and methods to train one or more neural networks to synthesize a second audio signal based, at least in part, on one or more characteristics of a first audio signal.

34 Claims, 9 Drawing Sheets

(56) References Cited

OTHER PUBLICATIONS

Prenger et al., "WaveGlow: A Flow-based Generative Network for Speech Synthesis," Oct. 31, 2018, retrieved Oct. 13, 2020, from https://arxiv.org/pdf/1811.00002.pdf, 5 pages.

Arik et al., "Deep Voice 2: Multi-Speaker Neural Textto-Speech," Sep. 20, 2017, 15 pages.

Arik et al., "Deep Voice: Real-Time Neural Text-to-Speech," Mar. 7, 2017, 17 pages.

Arik et al., "Fast Spectrogram Inversion Using Multi-Head Convolutional Neural Networks," Nov. 6, 2018, 6 pages.

Dinh et al., "Density Estimation Using Real NVP," Nov. 14, 2016, 30 pages.

Dinh et al., "NICE: Non-Linear Independent Components Estimation," Dec. 19, 2014, 11 pages.

Griffin et al., "Signal Estimation from Modified Short-Time Fourier Transform," IEEE Transactions on Acoustics, Speech, and Signal Processing, 32(2): Apr. 1984, 8 pages.

Ito et al., "The LJ Speech Dataset," retrieved from https://keithito.com/LJ-Speech-Dataset/, 2017, 5 pages.

Jin et al., "FFTNET: A Real-Time Speaker-Dependent Neural Vocoder," The 43rd IEEE International Conference on Acoustics, Speech and Signal Processing, Apr. 2018, 5 pages.

Kalchbrenner et al., "Efficient Neural Audio Synthesis," Jun. 25, 2018, 10 pages.

Kingma et al. "Adam: A Method for Stochastic Optimization," arXiv:1412.6980, dated Dec. 22, 2014, 9 pages.

Kingma et al., "Glow: Generative Flow with Invertible 1×1 Convolutions," Jul. 10, 2018, 15 pages.

Kingma et al., "Improved Variational Inference with Inverse Autoregressive Flow," Neural Information Processing Systems, 2016, 9 pages.

Oord et al., "Parallel WaveNet: Fast High-Fidelity Speech Synthesis," Proceedings of the 35th International Conference on Machine Learning, 2018, 9 pages.

Oord et al., "WAVENET: A Generative Model for Raw Audio," 2016, 15 pages.

Parmar et al., "Image Transformer," ICML, 2018, 10 pages.

Ping et al., "ClariNet: Parallel Wave Generation in End-to-End Text-to-Speech," Jul. 30, 2018, 12 pages.

Rezende et al., "Variational Inference with Normalizing Flows," Jun. 22, 2015, 10 pages.

Salimans et al., "Weight Normalization: A Simple Reparameterization to Accelerate Training of Deep Neural Networks," Advances in Neural Information Processing Systems, 2016, 9 pages.

Shen et al., "Natural TTS Synthesis by Conditioning WaveNet on Mel Spectrogram Predictions," Dec. 16, 2017, 5 pages.

Wang et al., "Tacotron: A Fully End-to-End Text-to-Speech Synthesis Model," Apr. 6, 2017, 10 pages.

Yamamoto, "Wavenet Vocoder," retrieved from https://zenodo.org/record/1472609#.YofMEHUpCUk, Oct. 27, 2018, 4 pages.

* cited by examiner

300

302

To/From Xbar

INVERTIBLE NEURAL NETWORK TO SYNTHESIZE AUDIO SIGNALS

TECHNICAL FIELD

In at least one embodiment, a processor comprises one or more arithmetic logic units (ALUs) to perform training and/or inferencing using neural networks. In at least one embodiment, one or more neural networks are trained in a first direction using a first audio signal and are used to inference in a second direction to synthesize a second audio signal.

BACKGROUND

There are many challenges surrounding synthesizing audio waveforms—small changes in voice quality or latency can have large impacts on perceived quality of audio and negatively impact experiences of listeners and listener preferences. High quality, real-time speech synthesis presents many challenges. Speech synthesis may involve generating very high dimensional samples with strong long term dependencies. Additionally, human listeners can be sensitive to statistical imperfections in audio samples. Accordingly, there are many challenges in field of speech synthesis to generate high quality audio without sacrificing quality at rates that may even exceed real-time requirements.

BRIEF DESCRIPTION OF DRAWINGS

Various techniques will be described with reference to drawings, in which.

DETAILED DESCRIPTION

In at least one embodiment, techniques described herein are utilized to implement a flow-based network to generate high quality audio waveforms. In at least one embodiment, mel-spectrograms are used as inputs to a flow-based network to generate high quality speech. In at least one embodiment, a flow-based model for synthesizing human speech is implemented using a single network to provide fast, efficient, and high quality audio synthesis without requiring use of autoregression. In at least one embodiment, a flow-based model is a neural network trained using a single cost function to maximize a likelihood of training data, which makes training procedure simple and stable. In at least one embodiment, a flow-based network is used to generate audio samples at a rate of over 500 kHz in a parallelized multi-processor computing environment.

In at least one embodiment, a flow-based invertible neural network generates high-quality speech from mel-spectrograms, which are acoustic time-frequency representations of sound. In at least one embodiment, a single neural network is trained with a single cost function, making training procedure easier and more stable than other approaches attempted. In at least one embodiment, a neural network comprises an invertible 1×1 convolution and an affine coupling layer including an audio transform such that an audio transform function need not be invertible since inputs to audio transform functions are passed through to outputs of affine coupling layers. In at least one embodiment, a neural network is trained on audio samples to generate white noise (e.g., a zero mean spherical Gaussian) and said neural network is inverted to generate a desired audio output (e.g., human speech according to a set of parameters) from an input of white noise.

In preceding and following descriptions, various techniques are described. For purposes of explanation, specific configurations and details are set forth in order to provide a thorough understanding of possible ways of implementing techniques. However, it will also be apparent that techniques described below may be practiced in different configurations without specific details. Furthermore, well-known features may be omitted or simplified to avoid obscuring techniques being described. In at least one embodiment, a flow-based network is used to generate audio samples across multiple processors in a parallelized manner at a rate of over 500 kHz while having audio quality at least as good as other attempted approaches.

Figure 1:
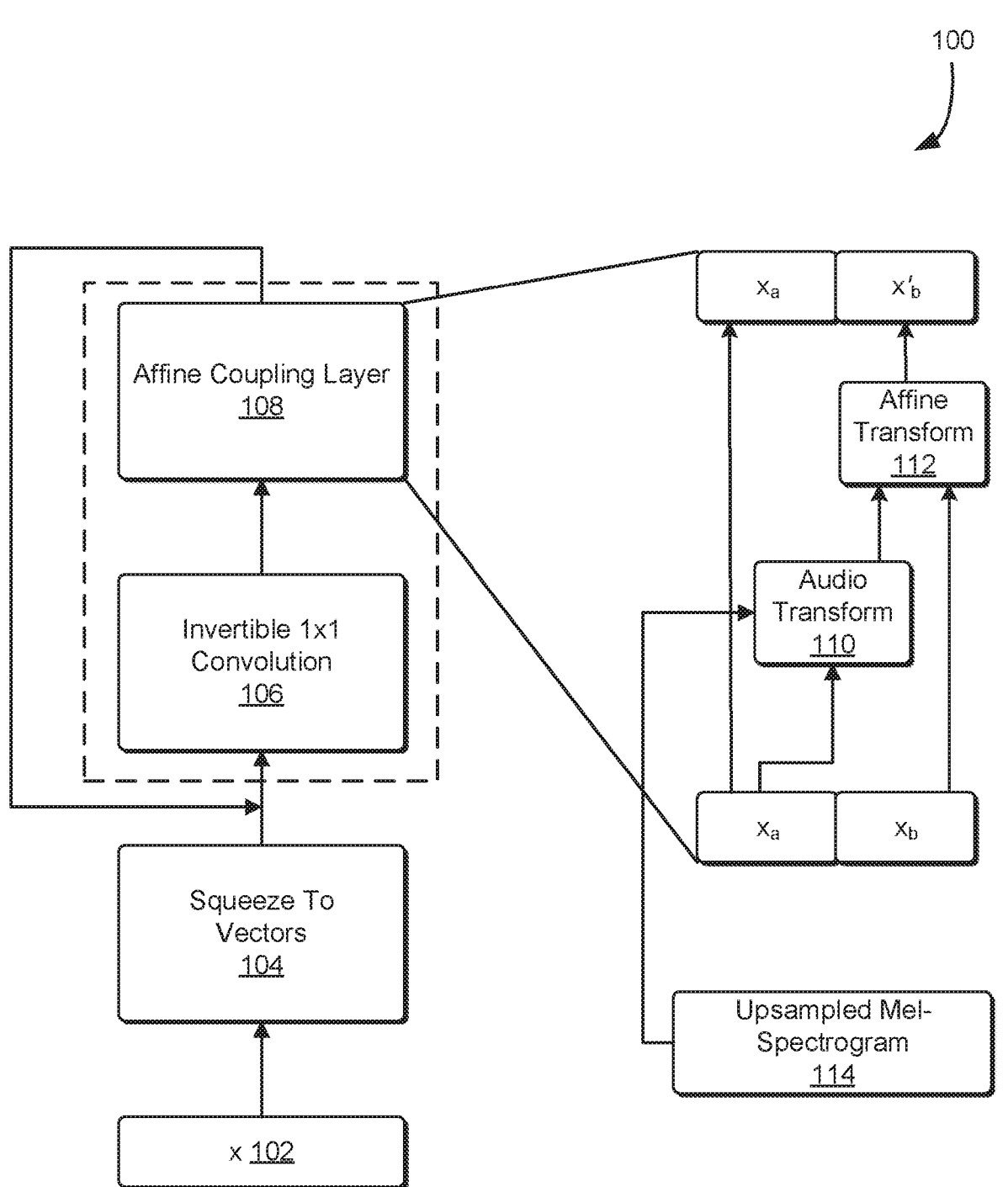
FIG. 1 illustrates a diagram of a system in which an embodiment in accordance with this disclosure is implemented.

FIG. 1 illustrates a diagram of a system 100 in which an embodiment in accordance with this disclosure is implemented. In at least one embodiment, a flow-based network is a neural network that generates audio outputs (e.g., in a form of a waveform) by sampling from a distribution. In at least one embodiment, a neural network is used as a generative model to sample from a statistical distribution. In at least one embodiment, a distribution is a zero mean spherical Gaussian with a same number of dimensions as a target output, and those samples are put through a series of layers that transform a distribution to one which has a target distribution. In at least one embodiment, a model is of a distribution of audio samples conditioned on a mel-spectrogram.

$$z \sim N(z; 0, I)$$

$$x = f_0 \circ f_1 \circ f_2 \circ \ldots f_k(z)$$

While a Gaussian distribution is described herein, other suitable distributions beyond spherical multivariate Gaussian distributions are contemplated within scope of this disclosure, in accordance with one embodiment.

In at least one embodiment, a system trains a model on audio samples 102 by directly minimizing a negative log-likelihood of data. In at least one embodiment, an audio samples are high quality speech clips or compressed representations thereof. It should be noted that, in at least one embodiment, training a model with an arbitrary neural network is intractable or otherwise infeasible to solve. In at least one embodiment, a flow-based network is used to solve a problem by ensuring a neural network mapping is invertible. In at least one embodiment, each layer of a network is restricted to be bijective and a likelihood is calculated, in at least one embodiment, by directly using a change of variables:

$$\log p_\theta(x) = \log p_\theta(z) + \sum_{i=1}^{k} \log \left| \det\left( J\left(f_i^{-1}(x)\right)\right)\right|$$

$$z = f_k^{-1} \circ f_{k-1}^{-1} \circ \ldots \ f_0^{-1}(x)$$

As described above, a first term, in accordance with one embodiment, is a log-likelihood (e.g., of a spherical Gaussian) term that penalizes $l_2$ norm of a transformed sample. In at least one embodiment, a second term arises from a change of variables and J is a Jacobian. In at least one embodiment, a log-determinant of a Jacobian rewards (e.g., conditions) layers for increasing volume of space during forward pass. In at least one embodiment, this term penalizes and/or prevents a layer from multiplying x term by zero to optimize $l_2$ norm. In at least one embodiment, this sequence of transformations is referred to as a normalizing flow.

For a forward pass through a network, in at least one embodiment, groups of audio samples (e.g., 8 samples, although more or less are possible) are taken as vectors, which is referred to as a squeeze 104 operation illustrated in FIG. 1. In at least one embodiment, vectors, once obtained, are processed through several steps of flow. In at least one embodiment, a step of flow comprises of an invertible 1×1 convolution 106 followed by an affine coupling layer 108.

In at least one embodiment, a coupling layer is described in terms of a coupling law. In at least one embodiment, let $x \in X$, $I_1, I_2$ a partition of $[\![1, D]\!]$ such that $d = |I_1|$ and m a function defined on $\mathbb{R}^d$ such that $y = (y_{I_1} = y_{I_2})$ where $y_{I_1} = x_{I_1}$ and $y_{I_2} = g\ (x_{I_2}; m(x_{I_1}))$ and $g \colon \mathbb{R}^{D-d} \times m(\mathbb{R}^d) \to \mathbb{R}^{D-d}$ is a coupling law, an invertible map with respect to its first argument given a second argument. In at least one embodiment, if $I_1 = [\![1, d]\!]$ and $I_2 = [\![d, D]\!]$, a Jacobian of this function is:

$$\frac{\partial y}{\partial x} = \begin{bmatrix} I_d & 0 \\ \frac{\partial y_{I_2}}{\partial x_{I_2}} & \frac{\partial y_{I_2}}{\partial x_{I_2}} \end{bmatrix}$$

where $I_d$ is an identity matrix of size d—accordingly, $$\det \frac{\partial y}{\partial x} = \det \frac{\partial y_{I_2}}{\partial x_{I_2}}.$$

It should be noted that a mapping can be inverted as follows:

$$x_{I_1} = y_{I_1}$$

$$x_{I_2} = g^{-1}\left(y_{I_1}; m(y_{I_1})\right)$$

and such a transformation may be referred to as a coupling layer with a coupling function m( ).

An invertible neural network, in at least one embodiment, is constructed at least in part using coupling layers. In at least one embodiment, a neural network comprises an affine coupling layer. In at least one embodiment, a channel is split (e.g., in half) and a portion of channels serve as inputs which produce multiplicative terms that are used to scale and translate remaining channels:

$$x_a, x_b, = \text{split}(x)$$

$$(\log\ s, t) = WN(x_a, mel - \text{spectrogram})$$

$$x_b' = s \odot x_b + t$$

$$f_{coupling}^{-1}(x) = concat(x_a, x_b')$$

where WN( ) is an audio transformation 110 and $\odot$ denotes an element-wise multiplication operator. In at least one embodiment, conditioning a model on other input variables, an audio transform function generation of audio with one or more characteristics encoded as a set of parameters for different properties of audio including but not limited to: pitch; loudness; intonation; rate of speech; rhythm; stress; articulation; and more. In at least one embodiment, in a multi-speaker sets of parameters are encoded for different speaker profiles and a speaker identifier is fed to a model as an extra input to condition speech. In at least one embodiment, for text-to-speech, text is fed in as an extra input. In at least one embodiment, an affine transformation 112 is a transformation that preserves collinearity (i.e., all points lying on a line initially still lie on a line after transformation) and ratios of distances (e.g., a midpoint of a line segment remains a midpoint after transformation). an affine transformation, in at least one embodiment, is used to compute a portion of a output of a coupling layer, $$x_b'.$$

In at least one embodiment, a coupling layer preserves invertibility of an overall network. In at least one embodiment, a coupling layer is invertible while WN( ) is not invertible. In at least one embodiment, channels used as inputs to WN( )—in this case, $x_a$, are passed through unchanged to a output of a layer. Accordingly, when inverting a network, s and t can be computed from a output $x_a$, and $$x_b'.$$

is inverted to compute $x_b$ by computing $WN(x_a, mel\text{-spectrogram})$. In at least one embodiment, WN( ) is an audio transformation that uses layers of dilated convolutions with gated-tan h nonlinearities, as well as residual connections and skip connections. In at least one embodiment, dilated convolutions are not necessarily causal. In at least one embodiment, convolutions have multiple taps (e.g., 3 taps) and are not causal. In at least one embodiment, an affine coupling layer is where a mel-spectrogram is included in order to condition a generated result on an input. In at least one embodiment, upsampled mel-spectrograms 114 are added before gated-tan h nonlinearities of layers (e.g., of each layer). With an affine coupling layer, in at least one embodiment, only s term changes volume of mappings and adds a change of variables term to a loss. In at least one embodiment, a term serves to penalize a model for non-invertible affine mappings.

$$\log\left|\det\left(J\left(f_{coupling}^{-1}(x)\right)\right)\right| = \log|s|$$

Channels in same half of a coupling layer, in at least one embodiment, do not directly modify one another. In at least one embodiment, information is mixed across channels by adding an invertible 1×1 convolution layer before some or all affine coupling layers. In at least one embodiment, W weights of these convolutions are initialized to be orthonormal and hence invertible. In at least one embodiment, a log-determinant of a Jacobian of a transformation joins a loss function due to a change of variables and also serves to keep convolutions invertible as a network is trained.

$$f_{conv}^{-1} = Wx$$

$$\log\left|\det\left(J\left(f_{conv}^{-1}(x)\right)\right)\right| = \log|\det W|$$

After adding terms from coupling layer, final likelihood becomes, in at least one embodiment:

$$\log p_\theta(x) =$$

$$-\frac{z(x)^T z(x)}{2\sigma^2} + \sum_{j=0}^{\#coupling} \log s_j(x, mel - \text{spectrogram}) + \sum_{j=0}^{\#coupling} \log|\det W_k|$$

where a first term comes from a log-likelihood of a spherical Gaussian, in at least one embodiment. a $\sigma^2$ term, in at least one embodiment, is assumed variance of a Gaussian distribution, and remaining terms account for change of variables.

Rather than having all channels go through all layers, in at least one embodiment, a system outputs 2 of channels to a loss function after every 4 coupling layers. In at least one embodiment, after going through all layers of a network, final vectors are concatenated with all of previously output channels to make final output z. In at least one embodiment, outputting some dimensions early makes it easier for a network to add information at multiple time scales and facilitates a propagation of gradients to earlier layers, in a manner similar to skip connections. In at least one embodiment, additional squeeze operations are not added, so vectors get shorter throughout a network.

Once a network is trained, inferencing is, in at least one embodiment, performed by randomly sampling z values from a Gaussian and running them through said network. In at least one embodiment, a network is trained in connection with techniques described in connection with FIG. 1. In at least one embodiment, same network is used for training and inference (e.g., executed in a forward direction to train and a backwards direction to inference).

In at least one embodiment, system samples zs from a Gaussian with a lower standard deviation than that assumed during training. In at least one embodiment, this change results in higher quality audio. During training, in at least one embodiment, $\sigma=\sqrt{0.5}$ and during inference, zs is sampled from a Gaussian with standard deviation of 0.6.

A 1×1 convolutions are inverted, in at least one embodiment, by inverting weight matrices and inverse is guaranteed by loss. In at least one embodiment, mel-spectrograms are included at each coupling layers as before, but now affine transformations are inverted and these inverses are also guaranteed by loss.

$$x_a = \frac{x_a' - t}{s}$$

In at least one embodiment, a flow-based network used has 12 coupling layers and 12 invertible 1×1 convolutions. In at least one embodiment, coupling layer networks (WN) each have 8 layers of dilated convolutions (e.g., non-causal) with 512 channels used as residual connections and 256 channels in skip connections. In at least one embodiment, a model outputs 2 of channels every 4 coupling layers. In at least one embodiment, a network is trained on a parallel processing unit (e.g., those described below in connection with FIG. 5) having two or more processing units at a rate equal to or greater than real-time. Real-time constraints on audio processing refer to, in at least one embodiment, synthesis of audio at a rate of greater than (or possibly greater than or equal to) 16 kHz. In at least one embodiment, real-time constraint on audio processing refers to a need to generate or synthesize audio samples at a rate of 16,000-24,000 times per second. In at least one embodiment, techniques described herein synthesize audio at rates of 500 kHz or greater on a parallel processing unit. In at least one embodiment, an invertible neural network is not necessarily limited to neural networks that are mathematically proven to be invertible and includes functions, mappings, and relationships that exhibit properties of invertibility.

Figure 2:
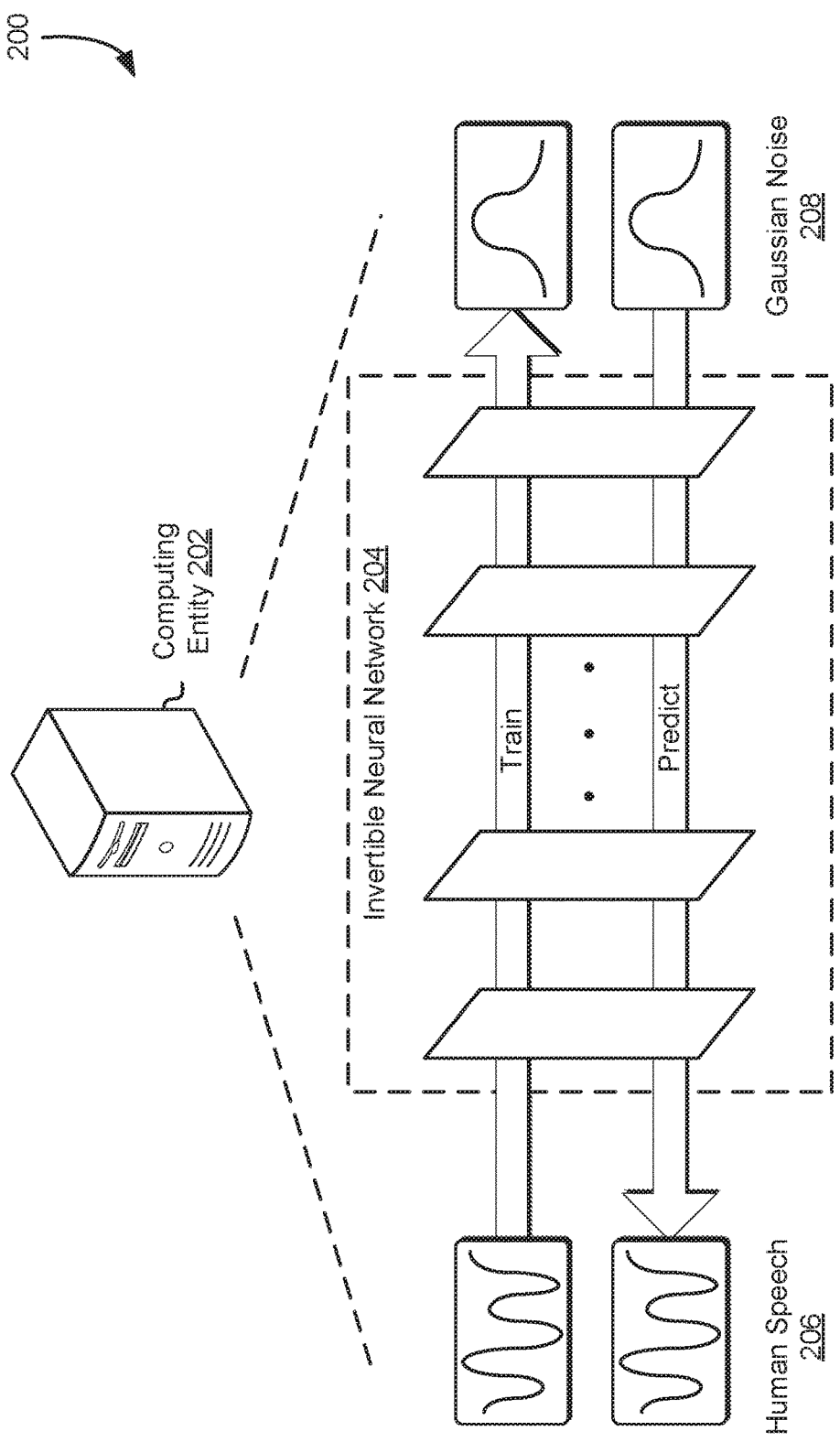
FIG. 2 illustrates a diagram of a system in which an embodiment in accordance with this disclosure is implemented.

FIG. 2 illustrates a diagram of a system 200 in which an embodiment in accordance with this disclosure is implemented. FIG. 2 illustrates a computing entity 202 which can be implemented in accordance with computer systems described in connection with FIG. 9. In at least one embodiment, computing entity 202 includes memory and one or more processors that, as a result of execution, cause said one or more processors to train and/or make inferences with an invertible neural network 204. Invertible neural network 204, in at least one embodiment, is implemented in accordance with those described elsewhere in this disclosure, including but not limited to those discussed in connection with FIG. 1. In at least one embodiment, computing entity 202 is a speech synthesis system that includes one or more audio output devices configured to play audio (e.g., human speech) generated by invertible neural network 204. In at least one embodiment, an audio output device includes one or more of: speakers; headphones; earphones; headsets; subwoofers; and more.

In at least one embodiment, computing entity 202 trains an invertible neural network 204 on human speech 206. In at least one embodiment, human speech is encoded as a high quality audio signal or a compact representation of human speech that discards phase information of human speech (e.g., mel-spectrogram). In at least one embodiment, a source for human speech is a human being or a computer system that generates human speech (e.g., a digital assistant or audio generated from text-to-speech). In at least one embodiment, an invertible neural network is trained to determine a set of parameters to maximize a likelihood of generating Gaussian noise 208. In at least one embodiment, Gaussian noise is a zero mean spherical Gaussian distribution having same number of audio samples as human speech. In at least one embodiment, an invertible neural network can be inverted and same set of parameters are used by an inverted neural network to generate human speech 206 from Gaussian noise 208. In at least one embodiment, an invertible neural network is executed in a forward direction on a set of parameters to obtain Gaussian noise from human speech and executed in a backwards (e.g., reverse) direction on a same set of parameters to obtain human speech by sampling for Gaussian noise. In at least one embodiment, an invertible neural network is executed in a backwards (e.g., reverse) direction on a set of parameters to obtain Gaussian noise from human speech and executed in a forwards direction on same set of parameters to obtain human speech by sampling for Gaussian noise.

Figures 3A, 3B:
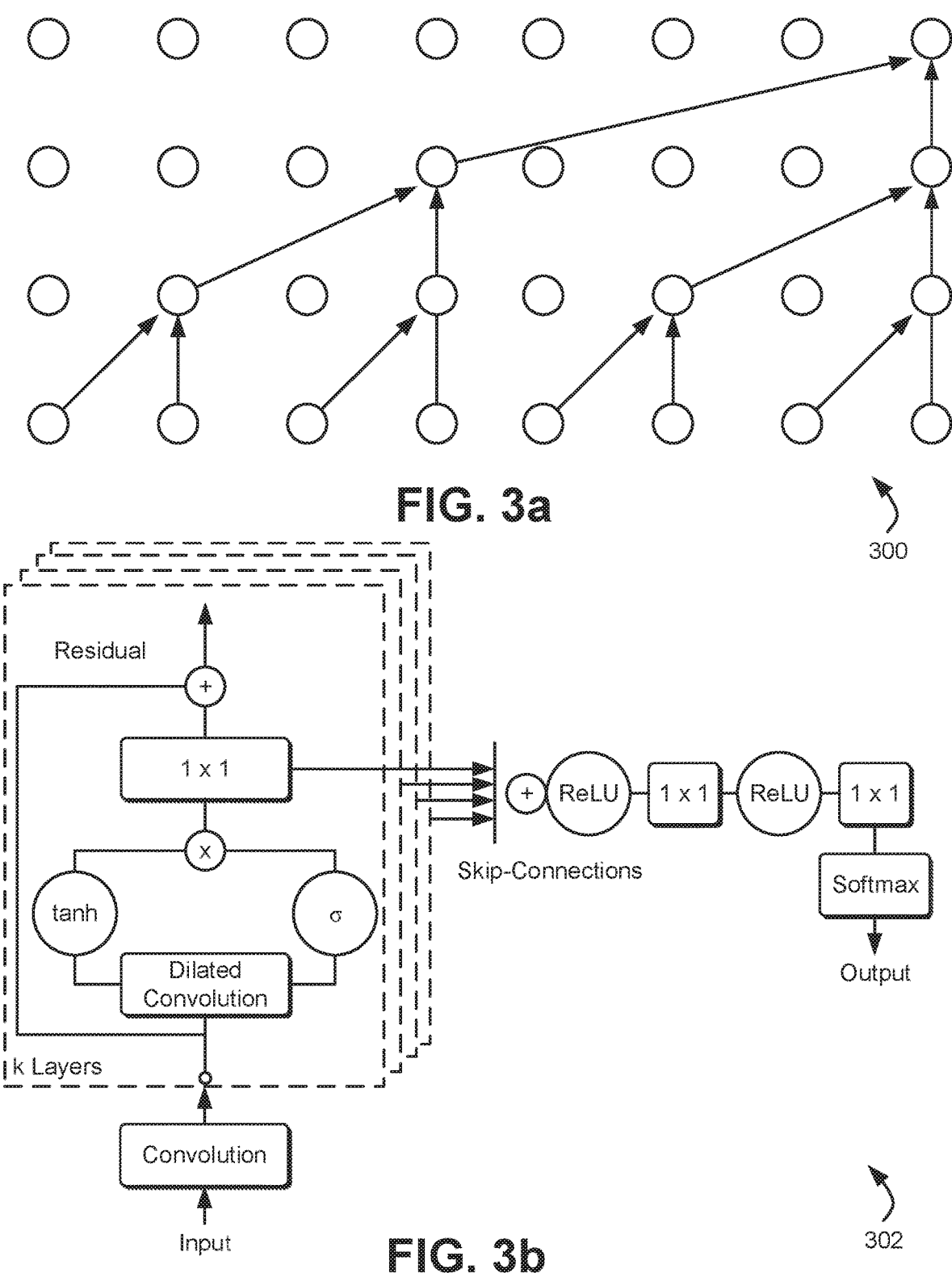
FIG. 3A illustrates a diagram of dilated convolutions in which an embodiment in accordance with this disclosure is implemented.
FIG. 3B illustrates a diagram of residual blocks and skip connections architecture in which an embodiment in accordance with this disclosure is implemented.

FIG. 3A illustrates a diagram of dilated convolutions 300 in which an embodiment in accordance with this disclosure is implemented. In at least one embodiment, dilated convolutions are in accordance with those described elsewhere in this disclosure, including but not limited to those discussed in connection with FIG. 1. In at least one embodiment, a dilated convolution is a convolution where a filter is applied over an area larger than its length by skipping input values with a certain step. In at least one embodiment, a dilated convolution effectively allows a network to operate on a coarser scale than with a normal convolution, similar to pooling or strided convolutions, but with a output having a same size as a input. As a special case, dilated convolution with dilation 1 yields a standard convolution. In at least one embodiment, FIG. 3 illustrates dilated causal convolutions for dilations 1, 2, and 4. In at least one embodiment, stacked dilated convolutions enable networks to have very large receptive fields with just a few layers, while preserving input resolution throughout a network as well as computational efficiency. In at least one embodiment, exponentially increasing a dilation factor results in exponential receptive field growth with depth and stacking these blocks further increases model capacity and receptive field size.

FIG. 3B illustrates a diagram of residual blocks and skip connections architecture 302 in which an embodiment in accordance with this disclosure is implemented. In at least one embodiment, residual blocks and skip connections architecture is in accordance with those described elsewhere in this disclosure, including but not limited to those discussed in connection with FIG. 1. In at least one embodiment, gated activation units are: $z=\tan h(W_{f,k} * x) \odot \sigma (W_{g,k} * x)$ where * denotes a convolution operation, $\odot$ denotes an element-wise multiplication operation, a denotes a sigmoid function, k is a layer index, f and g denote filter and gate respectively, and W is a learnable convolution filter. In at least one embodiment, this non-linearity is used for modeling audio inputs and outputs.

Figure 4:
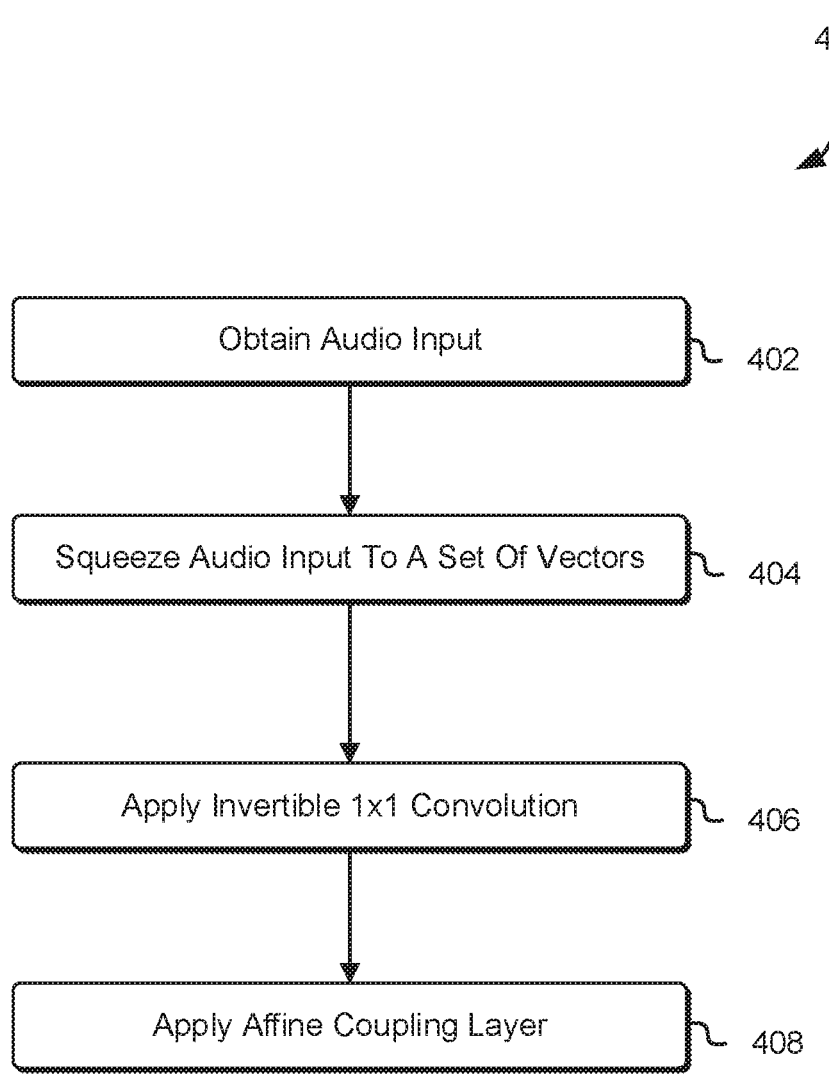
FIG. 4 shows an illustrative example of a process to generate audio by sampling from a distribution, in accordance with one embodiment.

FIG. 4 shows an illustrative example of a process 400 to generate audio by sampling from a distribution, in accordance with an embodiment. In at least one embodiment, some or all of process 400 (or any other processes described herein, or variations and/or combinations thereof) is performed under control of one or more computer systems configured with computer-executable instructions and may be implemented as code (e.g., computer-executable instructions, one or more computer programs, or one or more applications) executing collectively on one or more processors, by hardware, software, or combinations thereof. Code, in at least one embodiment, is stored on a computer-readable storage medium as a computer program comprising a plurality of computer-readable instructions executable by one or more processors. A computer-readable storage medium, in at least one embodiment, is a non-transitory computer-readable medium. In at least one embodiment, at least some computer-readable instructions usable to perform process 400 are not stored solely using transitory signals (e.g., a propagating transient electric or electromagnetic transmission). A non-transitory computer-readable medium does not necessarily include non-transitory data storage circuitry (e.g., buffers, caches, and queues) within transceivers of transitory signals.

A system, in at least one embodiment, obtains 402 an audio input. In at least one embodiment, system obtains an audio input as part of training a flow-based network. In at least one embodiment, a network is trained on a set of randomly chosen audio clips for multiple iterations using weight normalization. In at least one embodiment, a network is trained on a set of parallel processing units using randomly chose clips of 16,000 samples for 580,000 iterations using weight normalization and a Adam optimizer with batch size of 24 and a step size of $10^{-4}$. In at least one embodiment, learning rate is reduced when training reaches a plateau. In at least one embodiment, a learning rate is reduced by half as a result of detecting a training plateau (e.g., from $1 \times 10^{-4}$ to $5 \times 10^{-5}$). In at least one embodiment, a mel-spectrogram of original audio is used as an input to train a network. In at least one embodiment, a representation of an audio signal is an input to train a neural network. In at least one embodiment, inputs are mel-spectrograms with 80 bins using librosa mel filter defaults (e.g., each bin is normalized by a filter length and a scale is same as HTK). Parameters of mel-spectrograms, in at least one embodiment, are FFT size 1024, hop size 256, and window size 1024.

Mel-spectrograms may also be referred to as "mel-frequency spectrograms" or "mel spectrograms" throughout this disclosure. In at least one embodiment, a mel-frequency spectrogram is related to a linear-frequency spectrogram, e.g., a short-time Fourier transform (STFT) magnitude. It is obtained, in at least one embodiment, by applying a non-linear transform to a frequency axis of a SIFT, inspired by measured responses from a human auditory system, and summarizes a frequency content with fewer dimensions. Using such an auditory frequency scale has an effect of emphasizing details in lower frequencies, which are critical to speech intelligibility in at least one embodiment, while de-emphasizing high frequency details, which are dominated by fricatives and other noise bursts and generally do not need to be modeled with high fidelity. Because of these properties, features derived from a mel scale can be used as an underlying representation for speech recognition. While linear spectrograms discard phase information (and are therefore lossy), algorithms such as Griffin-Lim are capable of estimating this discarded information, which enables time-domain conversion via an inverse short-time Fourier transform. Mel-spectrograms discard even more information, presenting a challenging inverse problem. However, in comparison to linguistic and acoustic features used in Wave-Net, mel-spectrogram is a simpler, lower-level acoustic representation of audio signals. A spectrogram contains intensity information of time-varying spectrum of a waveform. Waveform to spectrogram conversion is fundamentally lossy, because a magnitude calculation removes a phase from a short-time Fourier transform.

In at least one embodiment, a system performs a squeeze 404 operation by taking groups of 8 audio samples as vectors and then process said vectors through steps of flow. In at least one embodiment, a squeeze operation transforms a tensor such that, for each channel, it divides a matrix into subsquares and then reshapes them into multiple subsquares (e.g., squeezing operation transforms as s×s×c tensor into a $$\frac{s}{2} \times \frac{s}{2} \times 4c$$

tensor), effectively trading spatial size for number of channels. In at least one embodiment, squeeze operation generates a set of vectors which are processed through steps of flow that include a 1×1 convolution followed by an affine coupling layer. In at least one embodiment, multiple steps of flow are performed for each vector (e.g., in parallel).

In at least one embodiment, an invertible 1×1 convolutional layer 406 is performed to mix information across channels. In at least one embodiment, W weight matrix of convolutions are initialized to be orthonormal and hence invertible. In at least one embodiment, a weight matrix is initialized as a rotation matrix that is used to perform a rotation in Euclidean space. In at least one embodiment, an invertible 1×1 convolutional layer is in accordance with those described in connection with FIG. 1 and elsewhere in this disclosure. In at least one embodiment, an affine coupling layer 408 is computed where half of channels serve as inputs, which then produce multiplicative and additive terms that are used to scale and translate remaining channels. In at least one embodiment, a affine coupling layer includes an audio transformation function that is not invertible while said affine coupling layer itself is invertible because channels used as inputs to WN( ) are passed through unchanged to output of layer. In at least one embodiment, an affine coupling layer is in accordance with those described in connection with FIG. 1 and elsewhere in this disclosure. In at least one embodiment, a neural network has 12 coupling layers and 12 invertible 1×1 convolutions.

Figure 5:
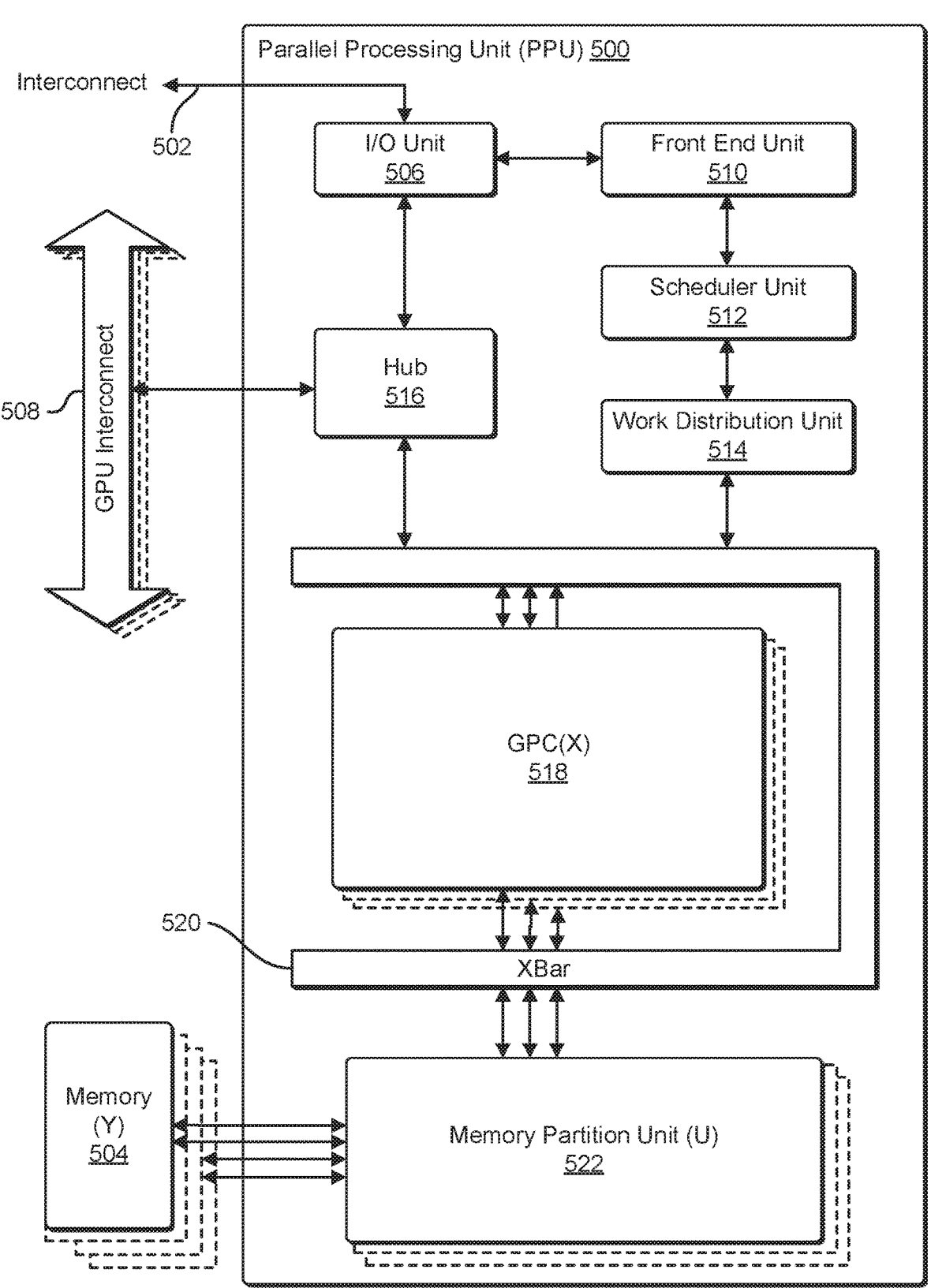
FIG. 5 illustrates an example of parallel processing unit ("PPU"), in accordance with an embodiment.

FIG. 5 illustrates a parallel processing unit ("PPU") 500, in accordance with one embodiment. In at least one embodiment, PPU 500 is configured with machine-readable code that, if executed by PPU, causes PPU to perform some or all of processes and techniques described throughout this disclosure. In at least one embodiment, PPU 500 is a multi-threaded processor that is implemented on one or more integrated circuit devices and that utilizes multithreading as a latency-hiding technique designed to process computer-readable instructions (also referred to as machine-readable instructions or simply instructions) on multiple threads in parallel. In at least one embodiment, a thread refers to a thread of execution and is an instantiation of a set of instructions configured to be executed by PPU 500. In at least one embodiment, PPU 500 is a graphics processing unit ("GPU") configured to implement a graphics rendering pipeline for processing three-dimensional ("3D") graphics data in order to generate two-dimensional ("2D") image data for display on a display device such as a liquid crystal display (LCD) device. In at least one embodiment, PPU 500 is utilized to perform computations such as linear algebra operations and machine-learning operations. FIG. 5 illustrates an example parallel processor for illustrative purposes only and should be construed as a non-limiting example of processor architectures contemplated within scope of this disclosure and that any suitable processor may be employed to supplement and/or substitute for same.

In at least one embodiment, PPU 500 comprises one or more arithmetic logic units (ALUs) are to be configured to help synthesize a second audio input based, at least in part, on one or more neural networks trained using one or more characteristics of a second audio signal and is in accordance with techniques described elsewhere in this disclosure including but not limited to FIG. 1. In at least one embodiment, one or more arithmetic logic units (ALUs) of PPU 500 are to train one or more neural networks to help synthesize a second audio signal based, at least in part, on one or more characteristics of a first audio signal. In at least one embodiment, one or more ALUs are to be configured to obtain a compact representation of Gaussian noise and invertible neural network is inverted to generate synthesized human speech from Gaussian noise. In at least one embodiment, synthesized human speech is a machine-generated audio signal produced by one or more neural networks in which audio signal was not originally spoken, uttered, performed, etc. by a human but rather synthesized by a machine to mimic speech, utterances, performances, etc. of a human. In at least one embodiment, one or more ALUs are to be configured to execute machine-readable instructions by loading machine-readable instructions into memory unit that provides commands (e.g., assembly commands) to one or more ALUs to process.

In at least one embodiment, one or more PPUs are configured to accelerate High Performance Computing ("HPC"), data center, and machine learning applications. In at least one embodiment, PPU 500 is configured to accelerate deep learning systems and applications including following non-limiting examples: autonomous vehicle platforms, deep learning, high-accuracy speech, image, text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and more.

In at least one embodiment, PPU 500 includes an Input/Output ("I/O") unit 506, a front-end unit 510, a scheduler unit 512, a work distribution unit 514, a hub 516, a crossbar ("Xbar") 520, one or more general processing clusters ("GPCs") 518, and one or more partition units 522. In at least one embodiment, PPU 500 is connected to a host processor or other PPUs 500 via one or more high-speed GPU interconnects 508. In at least one embodiment, PPU 500 is connected to a host processor or other peripheral devices via an interconnect 502. In at least one embodiment, PPU 500 is connected to a local memory comprising one or more memory devices 504. In at least one embodiment, local memory comprises one or more dynamic random access memory ("DRAM") devices. In at least one embodiment, one or more DRAM devices are configured and/or configurable as high-bandwidth memory ("HBM") subsystems, with multiple DRAM dies stacked within each device.

high-speed GPU interconnect 508 may refer to a wire-based multi-lane communications link that is used by systems to scale and include one or more PPUs 500 combined with one or more CPUs, supports cache coherence between PPUs 500 and CPUs, and CPU mastering. In at least one embodiment, data and/or commands are transmitted by high-speed GPU interconnect 508 through hub 516 to/from other units of PPU 500 such as one or more copy engines, video encoders, video decoders, power management units, and other components which may not be explicitly illustrated in FIG. 5.

In at least one embodiment, I/O unit 506 is configured to transmit and receive communications (e.g., commands, data) from a host processor (not illustrated in FIG. 5) over system bus 502. In at least one embodiment, I/O unit 506 communicates with host processor directly via system bus 502 or through one or more intermediate devices such as a memory bridge. In at least one embodiment, I/O unit 506 may communicate with one or more other processors, such as one or more of PPUs 500 via system bus 502. In at least one embodiment, I/O unit 506 implements a Peripheral Component Interconnect Express ("PCIe") interface for communications over a PCIe bus. In at least one embodiment, I/O unit 506 implements interfaces for communicating with external devices.

In at least one embodiment, I/O unit 506 decodes packets received via system bus 502. In at least one embodiment, at least some packets represent commands configured to cause PPU 500 to perform various operations. In at least one embodiment, I/O unit 506 transmits decoded commands to various other units of PPU 500 as specified by commands. In at least one embodiment, commands are transmitted to front-end unit 510 and/or transmitted to hub 516 or other units of PPU 500 such as one or more copy engines, a video encoder, a video decoder, a power management unit, etc. (not explicitly illustrated in FIG. 5). In at least one embodiment, I/O unit 506 is configured to route communications between and among various logical units of PPU 500.

In at least one embodiment, a program executed by host processor encodes a command stream in a buffer that provides workloads to PPU 500 for processing. In at least one embodiment, a workload comprises instructions and data to be processed by those instructions. In at least one embodiment, buffer is a region in a memory that is accessible (e.g., read/write) by both host processor and PPU 500—host interface unit may be configured to access buffer in a system memory connected to system bus 502 via memory requests transmitted over system bus 502 by I/O unit 506. In at least one embodiment, host processor writes command stream to buffer and then transmits a pointer to start of command stream to PPU 500 such that front-end unit 510 receives pointers to one or more command streams and manages one or more streams, reading commands from streams and forwarding commands to various units of PPU 500.

In at least one embodiment, front-end unit 510 is coupled to a scheduler unit 512 that configures various GPCs 518 to process tasks defined by one or more streams. In at least one embodiment, scheduler unit 512 is configured to track state information related to various tasks managed by scheduler unit 512 where state information may indicate which GPC 518 a task is assigned to, whether task is active or inactive, a priority level associated with task, and so forth. In at least one embodiment, scheduler unit 512 manages execution of a plurality of tasks on one or more GPCs 518.

In at least one embodiment, scheduler unit 512 is coupled to a work distribution unit 514 that is configured to dispatch tasks for execution on GPCs 518. In at least one embodiment, work distribution unit 514 tracks a number of scheduled tasks received from scheduler unit 512 and work distribution unit 514 manages a pending task pool and an active task pool for each of GPCs 518. In at least one embodiment, pending task pool comprises a number of slots (e.g., 32 slots) that contain tasks assigned to be processed by a particular GPC 518; active task pool may comprise a number of slots (e.g., 4 slots) for tasks that are actively being processed by GPCs 518 such that as a GPC 518 completes execution of a task, that task is evicted from active task pool for GPC 518 and one of other tasks from pending task pool is selected and scheduled for execution on GPC 518. In at least one embodiment, if an active task is idle on GPC 518, such as while waiting for a data dependency to be resolved, then active task is evicted from GPC 518 and returned to pending task pool while another task in pending task pool is selected and scheduled for execution on GPC 518.

In at least one embodiment, work distribution unit 514 communicates with one or more GPCs 518 via XBar 520. In at least one embodiment, XBar 520 is an interconnect network that couples many of units of PPU 500 to other units of PPU 500 and can be configured to couple work distribution unit 514 to a particular GPC 518. Although not shown explicitly, one or more other units of PPU 500 may also be connected to XBar 520 via hub 516.

Tasks are managed by scheduler unit 512 and dispatched to a GPC 518 by work distribution unit 514. GPC 518 is configured to process task and generate results. Results may be consumed by other tasks within GPC 518, routed to a different GPC 518 via XBar 520, or stored in memory 504. Results can be written to memory 504 via partition units 522, which implement a memory interface for reading and writing data to/from memory 504. Results can be transmitted to another PPU 504 or CPU via high-speed GPU interconnect 508. In at least one embodiment, PPU 500 includes a number U of partition units 522 that is equal to number of separate and distinct memory devices 504 coupled to PPU 500. A partition unit 522 will be described in more detail below in conjunction with FIG. 7.

In at least one embodiment, a host processor executes a driver kernel that implements an application programming interface ("API") that enables one or more applications executing on host processor to schedule operations for execution on PPU 500. In at least one embodiment, multiple compute applications are simultaneously executed by PPU 500 and PPU 500 provides isolation, quality of service ("QoS"), and independent address spaces for multiple compute applications. In at least one embodiment, an application generates instructions (e.g., in form of API calls) that cause driver kernel to generate one or more tasks for execution by PPU 500 and driver kernel outputs tasks to one or more streams being processed by PPU 500. In at least one embodiment, each task comprises one or more groups of related threads, which may be referred to as a warp. In at least one embodiment, a warp comprises a plurality of related threads (e.g., 32 threads) that can be executed in parallel. In at least one embodiment, cooperating threads can refer to a plurality of threads including instructions to perform task and that exchange data through shared memory. Threads and cooperating threads are described in more detail, in accordance with one embodiment, in conjunction with FIG. 7A.

Figure 6:
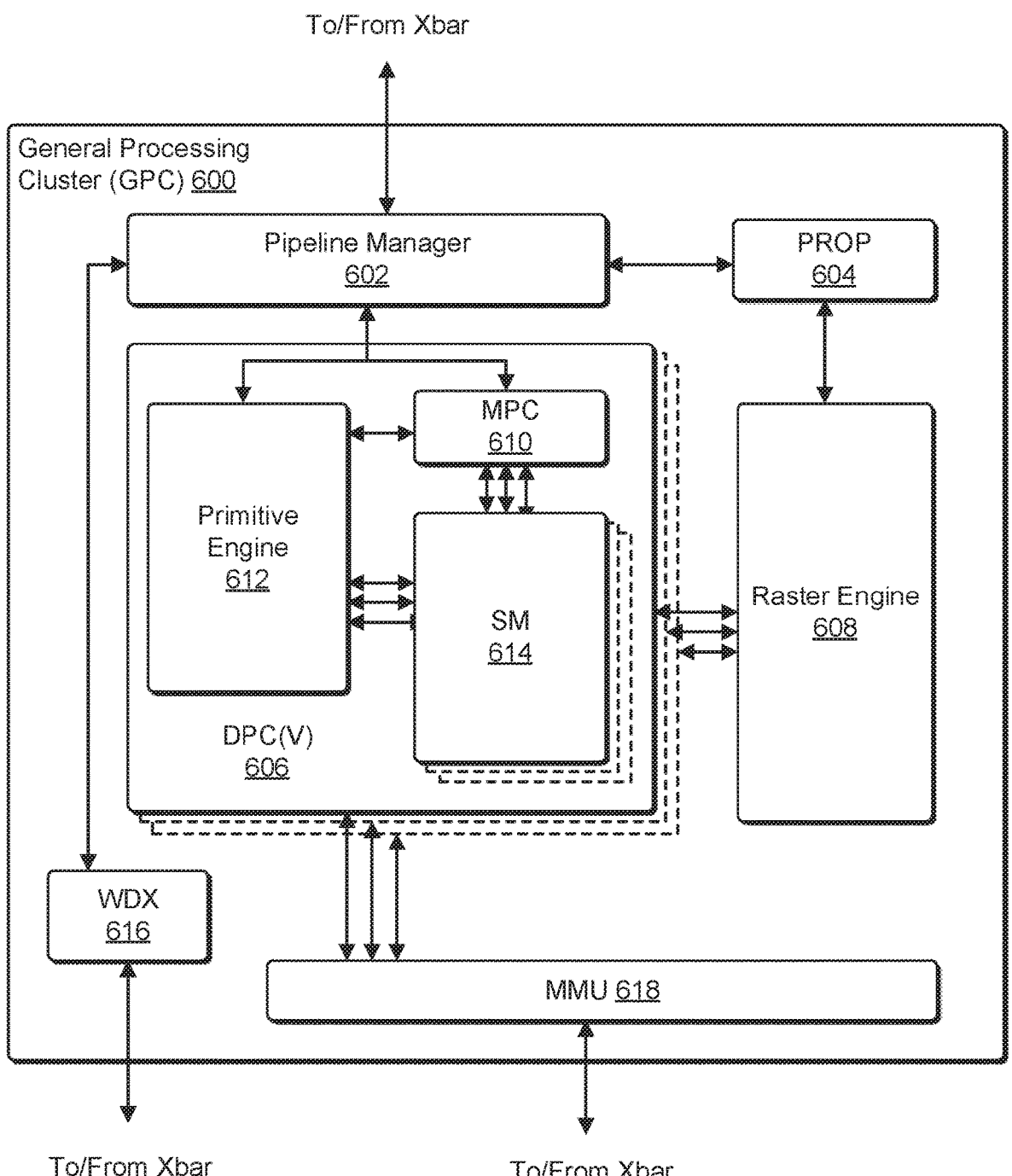
FIG. 6 illustrates an example of a general processing cluster ("GPC"), in accordance with one embodiment.

FIG. 6 illustrates a GPC 600 such as GPC illustrated of PPU 500 of FIG. 5, in accordance with one embodiment. In at least one embodiment, each GPC 600 includes a number of hardware units for processing tasks and each GPC 600 includes a pipeline manager 602, a pre-raster operations unit ("PROP") 604, a raster engine 608, a work distribution crossbar ("WDX") 616, a memory management unit ("MMU") 618, one or more Data Processing Clusters ("DPCs") 606, and any suitable combination of parts. It will be appreciated that GPC 600 of FIG. 6 may include other hardware units in lieu of or in addition to units shown in FIG. 6.

In at least one embodiment, operation of GPC 600 is controlled by pipeline manager 602. Pipeline manager 602 manages configuration of one or more DPCs 606 for processing tasks allocated to GPC 600. In at least one embodiment, pipeline manager 602 configures at least one of one or more DPCs 606 to implement at least a portion of a graphics rendering pipeline. In at least one embodiment, a DPC 606 is configured to execute a vertex shader program on programmable streaming multiprocessor ("SM") 614. pipeline manager 602 is configured to route packets received from a work distribution to appropriate logical units within GPC 600, in at least one embodiment, and some packets may be routed to fixed function hardware units in PROP 604 and/or raster engine 608 while other packets may be routed to DPCs 606 for processing by primitive engine 612 or SM 614. In at least one embodiment, pipeline manager 602 configures at least one of one or more DPCs 606 to implement a neural network model and/or a computing pipeline.

PROP unit 604 is configured, in at least one embodiment, to route data generated by raster engine 608 and DPCs 606 to a Raster Operations ("ROP") unit in memory partition unit, described in more detail above. In at least one embodiment, PROP unit 604 is configured to perform optimizations for color blending, organize pixel data, perform address translations, and more. Raster engine 608 includes a number of fixed function hardware units configured to perform various raster operations, in at least one embodiment, and raster engine 608 includes a setup engine, a coarse raster engine, a culling engine, a clipping engine, a fine raster engine, a tile coalescing engine, and any suitable combination thereof setup engine, in at least one embodiment, receives transformed vertices and generates plane equations associated with geometric primitive defined by vertices; plane equations are transmitted to coarse raster engine to generate coverage information (e.g., an x, y coverage mask for a tile) for primitive; output of coarse raster engine is transmitted to culling engine where fragments associated with primitive that fail a z-test are culled, and transmitted to a clipping engine where fragments lying outside a viewing frustum are clipped. In at least one embodiment, fragments that survive clipping and culling are passed to fine raster engine to generate attributes for pixel fragments based on plane equations generated by setup engine. In at least one embodiment, output of raster engine 608 comprises fragments to be processed by any suitable entity such as by a fragment shader implemented within a DPC 606.

In at least one embodiment, each DPC 606 included in GPC 600 comprises an M-Pipe Controller ("MPC") 610; a primitive engine 612; one or more SMs 614; and any suitable combination thereof. In at least one embodiment, MPC 610 controls operation of DPC 606, routing packets received from pipeline manager 602 to appropriate units in DPC 606. In at least one embodiment, packets associated with a vertex are routed to primitive engine 612, which is configured to fetch vertex attributes associated with vertex from memory; in contrast, packets associated with a shader program may be transmitted to SM 614.

In at least one embodiment, SM 614 comprises a programmable streaming processor that is configured to process tasks represented by a number of threads. In at least one embodiment, SM 614 is multi-threaded and configured to execute a plurality of threads (e.g., 32 threads) from a particular group of threads concurrently and implements a SIMD (Single-Instruction, Multiple-Data) architecture where each thread in a group of threads (e.g., a warp) is configured to process a different set of data based on same set of instructions. In at least one embodiment, all threads in group of threads execute same instructions. In at least one embodiment, SM 614 implements a SIMT (Single-Instruction, Multiple Thread) architecture wherein each thread in a group of threads is configured to process a different set of data based on same set of instructions, but where individual threads in group of threads are allowed to diverge during execution. In at least one embodiment, a program counter, call stack, and execution state is maintained for each warp, enabling concurrency between warps and serial execution within warps when threads within warp diverge. In another embodiment, a program counter, call stack, and execution state is maintained for each individual thread, enabling equal concurrency between all threads, within and between warps. In at least one embodiment, execution state is maintained for each individual thread and threads executing same instructions may be converged and executed in parallel for better efficiency. In at least one embodiment, SM 614 is described in more detail below.

In at least one embodiment, MMU 618 provides an interface between GPC 600 and memory partition unit and MMU 618 provides translation of virtual addresses into physical addresses, memory protection, and arbitration of memory requests. In at least one embodiment, MMU 618 provides one or more translation lookaside buffers ("TLBs") for performing translation of virtual addresses into physical addresses in memory.

Figure 7:
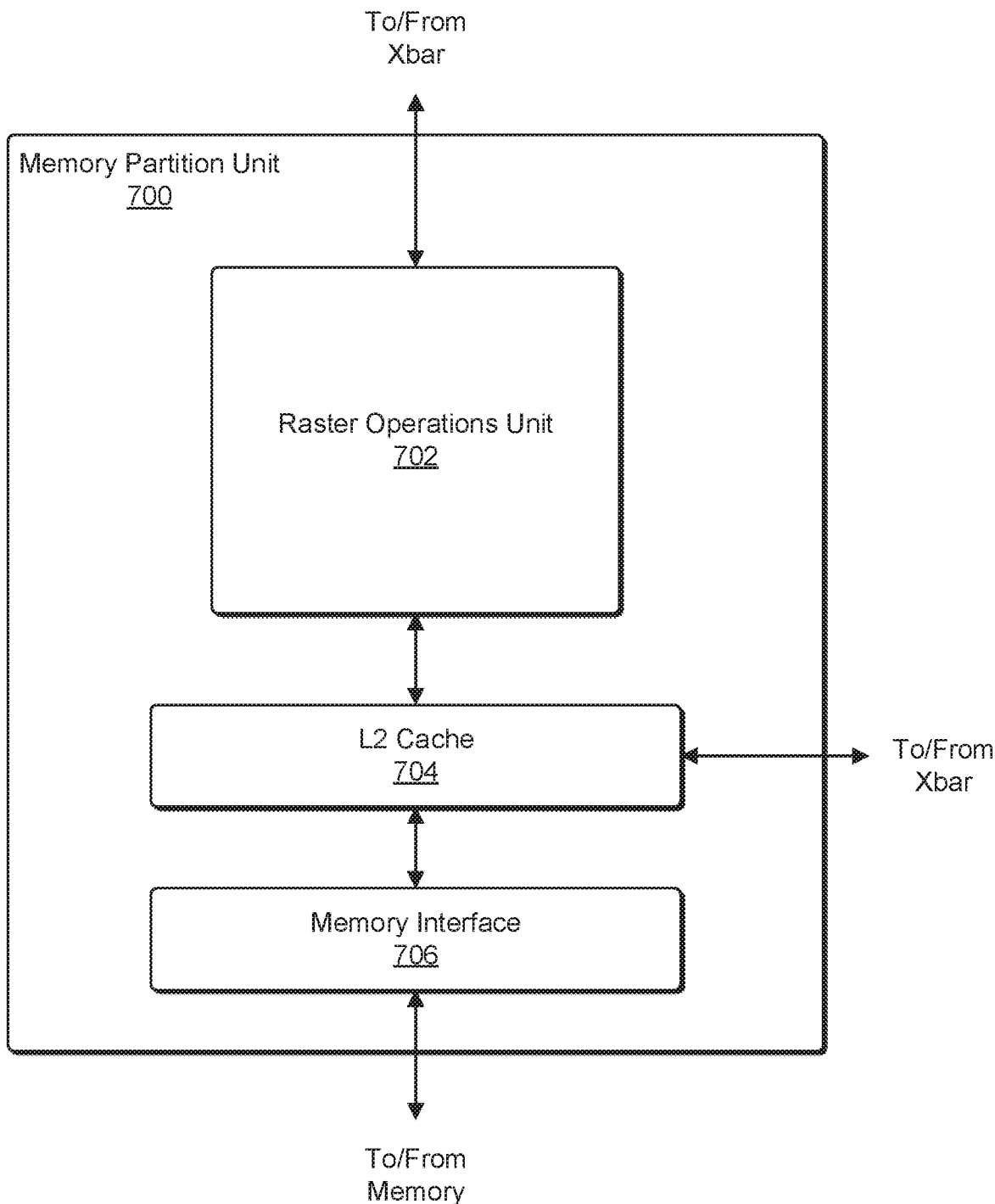
FIG. 7 illustrates an example of a memory partition unit, in accordance with one embodiment.

FIG. 7 illustrates a memory partition unit of a PPU, in accordance with one embodiment. In at least one embodiment, memory partition unit 700 includes a Raster Operations ("ROP") unit 702; a level two ("L2") cache 704; a memory interface 706; and any suitable combination thereof. Memory interface 706 is coupled to memory. Memory interface 706 may implement 32, 64, 128, 1024-bit data buses, or like, for high-speed data transfer. In at least one embodiment, PPU incorporates U memory interfaces 706, one memory interface 706 per pair of partition units 700, where each pair of partition units 700 is connected to a corresponding memory device. For example, PPU may be connected to up to Y memory devices, such as high bandwidth memory stacks or graphics double-data-rate, version 5, synchronous dynamic random access memory ("GDDR5 SDRAM").

In at least one embodiment, memory partition unit is configured to load computer-readable instructions from a machine-readable medium having stored thereon a set of instructions, which if performed by one or more processors, cause one or more processors to at least: train one or more neural networks to synthesize a second audio signal based, at least in part, on one or more characteristics of a first audio signal. In at least one embodiment, notes of music are a digital representation of a second audio signal and a first audio signal is a performance of notes music. In at least one embodiment, a digital representation of a first audio signal exists independently of a first audio signal. In an embodiment, notes of music exist independently of whether such notes were ever performed or recorded. In at least one embodiment, a set of audio training data includes representations of different audio signals and is used to train one or more neural network. In at least one embodiment, one or more neural networks are to generate Gaussian noise from a set of training audio in a first direction and is inverted to use Gaussian noise to synthesize audio signals.

In at least one embodiment, memory interface 706 implements an HBM2 memory interface and Y equals half U. In at least one embodiment, HBM2 memory stacks are located on same physical package as PPU, providing substantial power and area savings compared with conventional GDDR5 SDRAM systems. In at least one embodiment, each HBM2 stack includes four memory dies and Y equals 4, with HBM2 stack including two 128-bit channels per die for a total of 8 channels and a data bus width of 1024 bits.

In at least one embodiment, memory supports Single-Error Correcting Double-Error Detecting ("SECDED") Error Correction Code ("ECC") to protect data. ECC provides higher reliability for compute applications that are sensitive to data corruption. Reliability is especially important in large-scale cluster computing environments where PPUs process very large datasets and/or run applications for extended periods.

In at least one embodiment, PPU implements a multi-level memory hierarchy. In at least one embodiment, memory partition unit 700 supports a unified memory to provide a single unified virtual address space for CPU and PPU memory, enabling data sharing between virtual memory systems. In at least one embodiment frequency of accesses by a PPU to memory located on other processors is trace to ensure that memory pages are moved to physical memory of PPU that is accessing pages more frequently. In at least one embodiment, high-speed GPU interconnect 508 supports address translation services allowing PPU to directly access a CPU's page tables and providing full access to CPU memory by PPU.

In at least one embodiment, copy engines transfer data between multiple PPUs or between PPUs and CPUs. In at least one embodiment, copy engines can generate page faults for addresses that are not mapped into page tables and memory partition unit 700 then services page faults, mapping addresses into page table, after which copy engine performs transfer. In at least one embodiment, memory is pinned (i.e., non-pageable) for multiple copy engine operations between multiple processors, substantially reducing available memory. In at least one embodiment, with hardware page faulting, addresses can be passed to copy engines without regard as to whether memory pages are resident, and copy process is transparent.

Data from memory of FIG. 5 or other system memory is fetched by memory partition unit 700 and stored in L2 cache 704, which is located on-chip and is shared between various GPCs, in accordance with one embodiment. Each memory partition unit 700, in at least one embodiment, includes at least a portion of L2 cache 660 associated with a corresponding memory device. In at least one embodiment, lower level caches are implemented in various units within GPCs. In at least one embodiment, each of SMs 740 may implement a level one ("L1") cache wherein L1 cache is private memory that is dedicated to a particular SM 740 and data from L2 cache 704 is fetched and stored in each of L1 caches for processing in functional units of SMs 740. In at least one embodiment, L2 cache 704 is coupled to memory interface 706 and XBar 520.

ROP unit 702 performs graphics raster operations related to pixel color, such as color compression, pixel blending, and more, in at least one embodiment. ROP unit $$50, in at least one embodiment, implements depth testing in conjunction with raster engine 725, receiving a depth for a sample location associated with a pixel fragment from culling engine of raster engine 725. In at least one embodiment, depth is tested against a corresponding depth in a depth buffer for a sample location associated with fragment. In at least one embodiment, if fragment passes depth test for sample location, then ROP unit 702 updates depth buffer and transmits a result of depth test to raster engine 725. It will be appreciated that number of partition units 700 may be different than number of GPCs and, therefore, each ROP unit

702 can, in at least one embodiment, be coupled to each of GPCs. In at least one embodiment, ROP unit 702 tracks packets received from different GPCs and determines which that a result generated by ROP unit 702 is routed to through Xbar.

Figure 8:
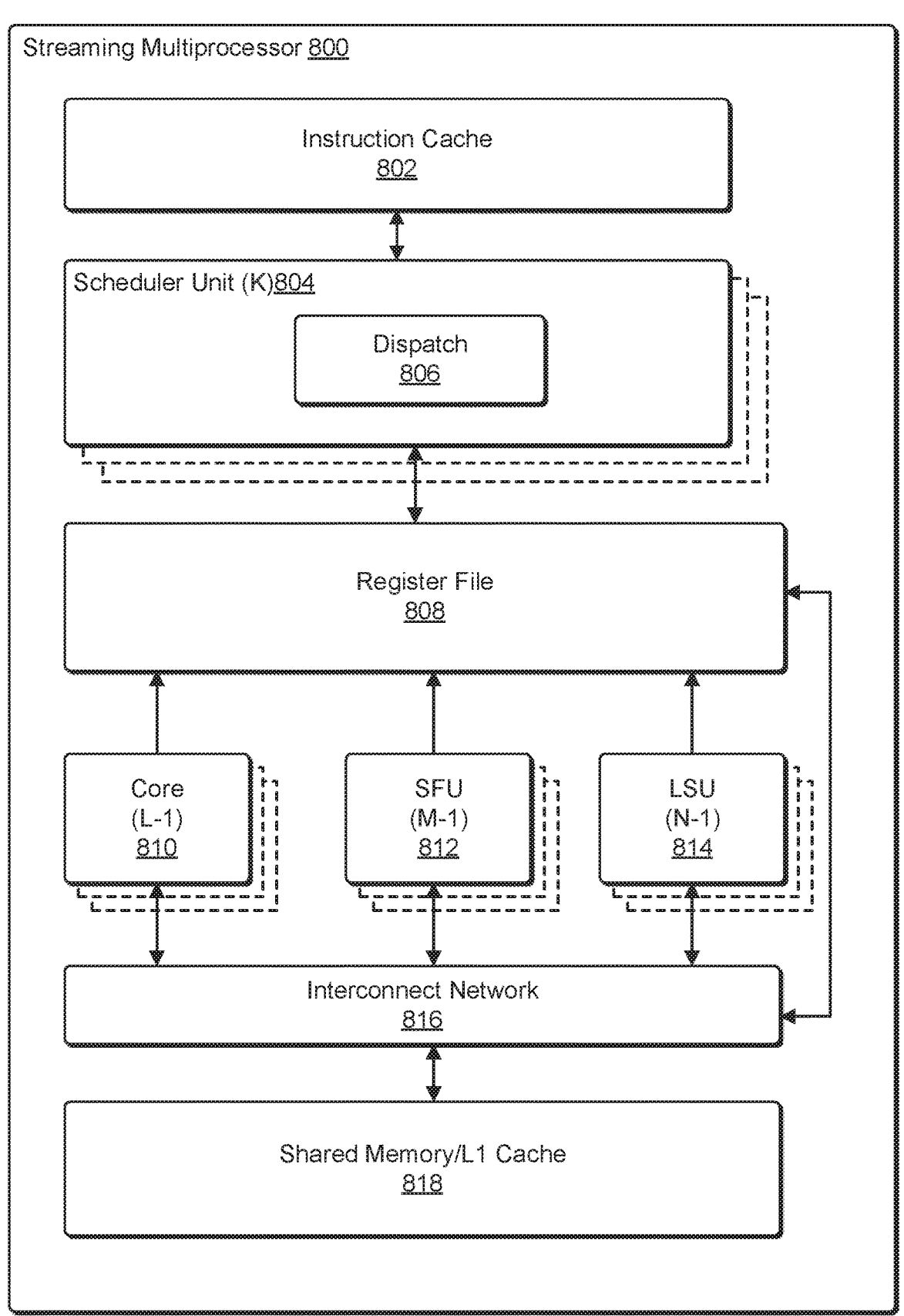
FIG. 8 illustrates an example of a streaming multiprocessor, in accordance with one embodiment.

FIG. 8 illustrates a streaming multi-processor such as streaming multi-processor of FIG. 6, in accordance with one embodiment. In at least one embodiment, SM 800 includes: an instruction cache 802; one or more scheduler units 804; a register file 808; one or more processing cores 810; one or more special function units ("SFUs") 812; one or more load/store units ("LSUs") 814; an interconnect network 816; a shared memory/L1 cache 818; and any suitable combination thereof. In at least one embodiment, work distribution unit dispatches tasks for execution on GPCs of PPU and each task is allocated to a particular DPC within a GPC and, if task is associated with a shader program, task is allocated to an SM 800. In at least one embodiment, scheduler unit 804 receives tasks from work distribution unit and manages instruction scheduling for one or more thread blocks assigned to SM 800. In at least one embodiment, scheduler unit 804 schedules thread blocks for execution as warps of parallel threads, wherein each thread block is allocated at least one warp. In at least one embodiment, each warp executes threads. In at least one embodiment, scheduler unit 804 manages a plurality of different thread blocks, allocating warps to different thread blocks and then dispatching instructions from plurality of different cooperative groups to various functional units (e.g., cores 810, SFUs 812, and LSUs 814) during each clock cycle.

Cooperative Groups may refer to a programming model for organizing groups of communicating threads that allows developers to express granularity at which threads are communicating, enabling expression of richer, more efficient parallel decompositions. In at least one embodiment, cooperative launch APIs support synchronization amongst thread blocks for execution of parallel algorithms. In at least one embodiment, applications of conventional programming models provide a single, simple construct for synchronizing cooperating threads: a barrier across all threads of a thread block (e.g., syncthreads( ) function). However, programmers would often like to define groups of threads at smaller than thread block granularities and synchronize within defined groups to enable greater performance, design flexibility, and software reuse in form of collective group-wide function interfaces. Cooperative Groups enables programmers to define groups of threads explicitly at sub-block (i.e., as small as a single thread) and multi-block granularities, and to perform collective operations such as synchronization on threads in a cooperative group. Programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

In at least one embodiment, a dispatch unit 806 is configured to transmit instructions to one or more of functional units and scheduler unit 804 includes two dispatch units 806 that enable two different instructions from same warp to be dispatched during each clock cycle. In at least one embodiment, each scheduler unit 804 includes a single dispatch unit 806 or additional dispatch units 806.

Each SM 800, in at least one embodiment, includes a register file 808 that provides a set of registers for functional units of SM 800. In at least one embodiment, register file 808 is divided between each of functional units such that each functional unit is allocated a dedicated portion of register file 808. In at least one embodiment, register file 808 is divided between different warps being executed by SM 800 and register file 808 provides temporary storage for operands connected to data paths of functional units. In at least one embodiment, each SM 800 comprises a plurality of L processing cores 810. In at least one embodiment, SM 800 includes a large number (e.g., 128 or more) of distinct processing cores 810. Each core 810, in at least one embodiment, includes a fully-pipelined, single-precision, double-precision, and/or mixed precision processing unit that includes a floating point arithmetic logic unit and an integer arithmetic logic unit. In at least one embodiment, floating point arithmetic logic units implement IEEE 754-2008 standard for floating point arithmetic. In at least one embodiment, cores 810 include 64 single-precision (32-bit) floating point cores, 64 integer cores, 32 double-precision (64-bit) floating point cores, and 8 tensor cores.

Tensor cores are configured to perform matrix operations in accordance with an embodiment. In at least one embodiment, one or more tensor cores are included in cores 810. In at least one embodiment, tensor cores are configured to perform deep learning matrix arithmetic, such as convolution operations for neural network training and inferencing. In at least one embodiment, each tensor core operates on a 4×4 matrix and performs a matrix multiply and accumulate operation $D=A\times B+C$, where A, B, C, and D are 4×4 matrices.

In at least one embodiment, matrix multiply inputs A and B are 16-bit floating point matrices and accumulation matrices C and D are 16-bit floating point or 32-bit floating point matrices. In at least one embodiment, tensor cores operate on 16-bit floating point input data with 32-bit floating point accumulation. In at least one embodiment, 16-bit floating point multiply requires 64 operations and results in a full precision product that is then accumulated using 32-bit floating point addition with other intermediate products for a 4×4×4 matrix multiply. Tensor cores are used to perform much larger two-dimensional or higher dimensional matrix operations, built up from these smaller elements, in at least one embodiment. In at least one embodiment, an API, such as CUDA 9 C++ API, exposes specialized matrix load, matrix multiply and accumulate, and matrix store operations to efficiently use tensor cores from a CUDA-C++ program. In at least one embodiment, at CUDA level, warp-level interface assumes 16×16 size matrices spanning all 32 threads of warp.

In at least one embodiment, each SM 800 comprises M SFUs 812 that perform special functions (e.g., attribute evaluation, reciprocal square root, and like). In at least one embodiment, SFUs 812 include a tree traversal unit configured to traverse a hierarchical tree data structure. In at least one embodiment, SFUs 812 include texture unit configured to perform texture map filtering operations. In at least one embodiment, texture units are configured to load texture maps (e.g., a 2D array of texels) from memory and sample texture maps to produce sampled texture values for use in shader programs executed by SM 800. In at least one embodiment, texture maps are stored in shared memory/L1 cache. Texture units implement texture operations such as filtering operations using mip-maps (e.g., texture maps of varying levels of detail), in accordance with one embodiment. In at least one embodiment, each SM 800 includes two texture units.

Each SM 800 comprises N LSUs 754 that implement load and store operations between shared memory/L1 cache 706 and register file 808, in at least one embodiment. Each SM 800 includes an interconnect network 816 that connects each of functional units to register file 808 and LSU 814 to register file 808, shared memory/L1 cache 818 in at least one embodiment. In at least one embodiment, interconnect network 816 is a crossbar that can be configured to connect any of functional units to any of registers in register file 808 and connect LSUs 814 to register file and memory locations in shared memory/L1 cache 818.

Shared memory/L1 cache 818 is an array of on-chip memory that allows for data storage and communication between SM 800 and primitive engine and between threads in SM 800 in at least one embodiment. In at least one embodiment, shared memory/L1 cache 818 comprises 128 KB of storage capacity and is in path from SM 800 to partition unit. Shared memory/L1 cache 818, in at least one embodiment, is used to cache reads and writes. One or more of shared memory/L1 cache 818, L2 cache, and memory are backing stores.

Combining data cache and shared memory functionality into a single memory block provides improved performance for both types of memory accesses, in at least one embodiment. capacity, in at least one embodiment, is used or is usable as a cache by programs that do not use shared memory, such as if shared memory is configured to use half of capacity, texture and load/store operations can use remaining capacity. Integration within shared memory/L1 cache 818 enables shared memory/L1 cache 818 to function as a high-throughput conduit for streaming data while simultaneously providing high-bandwidth and low-latency access to frequently reused data, in accordance with an embodiment. When configured for general purpose parallel computation, a simpler configuration can be used compared with graphics processing. In at least one embodiment, fixed function graphics processing units are bypassed, creating a much simpler programming model. In general purpose parallel computation configuration, work distribution unit assigns and distributes blocks of threads directly to DPCs, in at least one embodiment. threads in a block execute same program, using a unique thread ID in calculation to ensure each thread generates unique results, using SM 800 to execute program and perform calculations, shared memory/L1 cache 818 to communicate between threads, and LSU 814 to read and write global memory through shared memory/L1 cache 818 and memory partition unit, in accordance with one embodiment. In at least one embodiment, when configured for general purpose parallel computation, SM 800 writes commands that scheduler unit can use to launch new work on DPCs.

In at least one embodiment, PPU is included in or coupled to a desktop computer, a laptop computer, a tablet computer, servers, supercomputers, a smart-phone (e.g., a wireless, hand-held device), personal digital assistant ("PDA"), a digital camera, a vehicle, a head mounted display, a hand-held electronic device, and more. In at least one embodiment, PPU is embodied on a single semiconductor substrate. In at least one embodiment, PPU is included in a system-on-a-chip ("SoC") along with one or more other devices such as additional PPUs, memory, a reduced instruction set computer ("RISC") CPU, a memory management unit ("MMU"), a digital-to-analog converter ("DAC"), and like.

In at least one embodiment, PPU may be included on a graphics card that includes one or more memory devices. Graphics card may be configured to interface with a PCIe slot on a motherboard of a desktop computer. In yet another embodiment, PPU may be an integrate graphics processing unit ("iGPU") included in chipset of motherboard.

Figure 9:
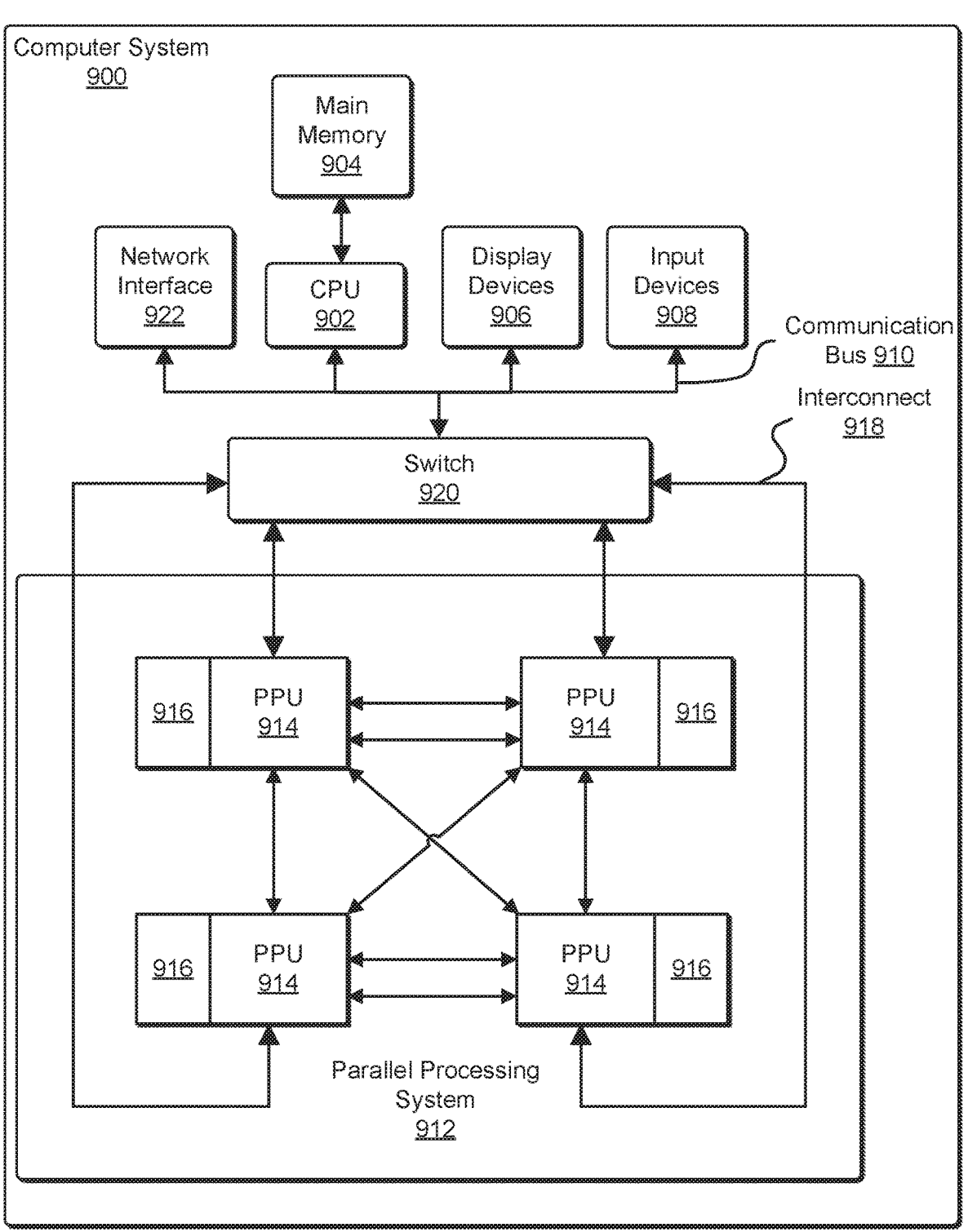
FIG. 9 illustrates a computer system in which various examples can be implemented, in accordance with one embodiment.

FIG. 9 illustrates a computer system 900 in which various architecture and/or functionality can be implemented, in accordance with one embodiment. Computer system 900, in at least one embodiment, is configured to implement various processes and methods described throughout this disclosure.

In at least one embodiment, computer system 900 comprises at least one central processing unit 902 that is connected to a communication bus 910 implemented using any suitable protocol, such as PCI (Peripheral Component Interconnect), PCI-Express, AGP (Accelerated Graphics Port), HyperTransport, or any other bus or point-to-point communication protocol(s). In at least one embodiment, computer system 900 includes a main memory 904 and control logic (e.g., implemented as hardware, software, or a combination thereof) and data are stored in main memory 904 which may take form of random access memory ("RAM"). In at least one embodiment, a network interface subsystem 922 provides an interface to other computing devices and networks for receiving data from and transmitting data to other systems from computer system 900.

computer system 900, in at least one embodiment, includes input devices 908, parallel processing system 912, and display devices 906 which can be implemented using a conventional CRT (cathode ray tube), LCD (liquid crystal display), LED (light emitting diode), plasma display, or other suitable display technologies. In at least one embodiment, user input is received from input devices 908 such as keyboard, mouse, touchpad, microphone, and more. In at least one embodiment, each of foregoing modules can be situated on a single semiconductor platform to form a processing system. In at least one embodiment, computer system 900 includes or is communicatively coupled to a microphone. In at least one embodiment, a microphone is a digital microphone. In at least one embodiment, any suitable sound capture device can be utilized to record an input signal. In at least one embodiment, an input signal is recorded or otherwise captured by a microphone and stored as an output signal. In at least one embodiment, a digital representation of an output signal is stored on a digital storage device by appropriately converted an analog signal to a digital format.

In at least one embodiment, computer system 900 comprises one or more processors that, as a result of execution of computer instructions, help synthesize a second audio signal based, at least in part, on one or more neural networks trained using one or more characteristics of a first audio signal; and one or more memories to store parameters associated with one or more neural networks. In at least one embodiment, computer system 900 comprises one or more processors to help train one or more neural networks to help synthesize a second audio signal based, at least in part, on one or more characteristics of a first audio signal; and one or more memories to store parameters associated with one or more neural networks.

In present description, a single semiconductor platform may refer to a sole unitary semiconductor-based integrated circuit or chip. It should be noted that term single semiconductor platform may also refer to multi-chip modules with increased connectivity which simulate on-chip operation, and make substantial improvements over utilizing a conventional central processing unit ("CPU") and bus implementation. Of course, various modules may also be situated separately or in various combinations of semiconductor platforms per desires of user.

In at least one embodiment, computer programs in form of machine-readable executable code or computer control logic algorithms are stored in main memory 904 and/or secondary storage. Computer programs, if executed by one or more processors, enable system 900 to perform various functions in accordance with one embodiment. Memory 904, storage, and/or any other storage are possible examples of computer-readable media. Secondary storage may refer to any suitable storage device or system such as a hard disk drive and/or a removable storage drive, representing a floppy disk drive, a magnetic tape drive, a compact disk drive, digital versatile disk ("DVD") drive, recording device, universal serial bus ("USB") flash memory.

In at least one embodiment, architecture and/or functionality of various previous figures are implemented in context of central processor 902; parallel processing system 912; an integrated circuit capable of at least a portion of capabilities of both central processor 902; parallel processing system 912; a chipset (e.g., a group of integrated circuits designed to work and sold as a unit for performing related functions, etc.); and any suitable combination of integrated circuit.

In at least one embodiment, architecture and/or functionality of various previous figures is be implemented in context of a general computer system, a circuit board system, a game console system dedicated for entertainment purposes, an application-specific system, and more. In at least one embodiment, computer system 900 may take form of a desktop computer, a laptop computer, a tablet computer, servers, supercomputers, a smart-phone (e.g., a wireless, hand-held device), personal digital assistant ("PDA"), a digital camera, a vehicle, a head mounted display, a hand-held electronic device, a mobile phone device, a television, workstation, game consoles, embedded system, and/or any other type of logic.

In at least one embodiment, a parallel processing system 912 includes a plurality of PPUs 914 and associated memories 916. In at least one embodiment, PPUs are connected to a host processor or other peripheral devices via an interconnect 918 and a switch 920 or multiplexer. In at least one embodiment, parallel processing system 912 distributes computational tasks across PPUs 914 which can be parallelizable—for example, as part of distribution of computational tasks across multiple GPU thread blocks. In at least one embodiment, memory is shared and accessible (e.g., for read and/or write access) across some or all of PPUs 914, although such shared memory may incur performance penalties relative to use of local memory and registers resident to a PPU. In at least one embodiment, operation of PPUs 914 is synchronized through use of a command such as_syncthreads( ) which requires all threads in a block (e.g., executed across multiple PPUs 914) to reach a certain point of execution of code before proceeding.

Specification and drawings are, accordingly, to be regarded in an illustrative rather than a restrictive sense. It will, however, be evident that various modifications and changes may be made thereunto without departing from broader spirit and scope of invention as set forth in claims.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit invention to specific form or forms disclosed, but on contrary, intention is to cover all modifications, alternative constructions, and equivalents falling within spirit and scope of invention, as defined in appended claims.

Use of terms "a" and "an" and " " and similar referents in context of describing disclosed embodiments (especially in context of following claims) are to be construed to cover both singular and plural, unless otherwise indicated herein or clearly contradicted by context. Terms "comprising," "having," "including," and "containing" are to be construed as open-ended terms (i.e., meaning "including, but not limited to,") unless otherwise noted. term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. Use of term "set" (e.g., "a set of items") or "subset" unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, term "plurality" indicates a state of being plural (e.g., "a plurality of items" indicates multiple items). Number of items in a plurality is at least two, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (e.g., as a result of being executed) by one or more processors of a computer system, cause computer system to perform operations described herein. Set of non-transitory computer-readable storage media, in at least one embodiment, comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors— for example, a non-transitory computer-readable storage medium store instructions and a main CPU execute some of instructions while a graphics processor unit executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implement an embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of invention and does not pose a limitation on scope of invention unless otherwise claimed. No language in specification should be construed as indicating any non-claimed element as essential to practice of invention.

Embodiments of this disclosure are described herein, including best mode known to inventors for carrying out invention. Variations of those embodiments may become apparent to those of ordinary skill in art upon reading foregoing description. Inventors expect skilled artisans to employ such variations as appropriate and inventors intend for embodiments of present disclosure to be practiced otherwise than as specifically described herein. Accordingly, scope of present disclosure includes all modifications and equivalents of subject matter recited in claims appended hereto as permitted by applicable law. Moreover, any combination of above-described elements in all possible variations thereof is encompassed by scope of present disclosure unless otherwise indicated herein or otherwise clearly contradicted by context.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a Central Processing Unit (CPU) or a Graphics Processing Unit (GPU). A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. Terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. Process of obtaining, acquiring, receiving, or inputting analog and digital data can be accomplished in a variety of ways such as by receiving data as a parameter of a function call or a call to an application programming interface. In some implementations, process of obtaining, acquiring, receiving, or inputting analog or digital data can be accomplished by transferring data via a serial or parallel interface. In another implementation, process of obtaining, acquiring, receiving, or inputting analog or digital data can be accomplished by transferring data via a computer network from providing entity to acquiring entity. References may also be made to providing, outputting, transmitting, sending, or presenting analog or digital data. In various examples, process of providing, outputting, transmitting, sending, or presenting analog or digital data can be accomplished by transferring data as an input or output parameter of a function call, a parameter of an application programming interface or interprocess communication mechanism.

Although discussion above sets forth example implementations of described techniques, other architectures may be used to implement described functionality, and are intended to be within scope of this disclosure. Furthermore, although specific distributions of responsibilities are defined above for purposes of discussion, various functions and responsibilities might be distributed and divided in different ways, depending on circumstances.

Furthermore, although subject matter has been described in language specific to structural features and/or methodological acts, it is to be understood that subject matter defined in appended claims is not necessarily limited to specific features or acts described. Rather, specific features and acts are disclosed as exemplary forms of implementing claims.

Specification and drawings are, accordingly, to be regarded in an illustrative rather than a restrictive sense. It will, however, be evident that various modifications and changes may be made thereunto without departing from broader spirit and scope of invention as set forth in claims.

What is claimed is:

1. One or more processors, comprising:
circuitry to:
train one or more neural networks to infer one or more speech features of one or more voice audio signals to be generated based, at least in part, on training that uses speech of the one or more voice audio signals to train the one or more neural networks to infer speech features, wherein the one or more neural networks are trained by:
converting a compact representation of a first audio signal;
generating one or more Gaussian values based at least in part on the converted compact representation and the first audio signal; and
training the one or more neural networks using the one or more Gaussian values; and
generate the one or more voice audio signals with the trained one or more neural networks.

2. The one or more processors of claim 1, wherein the compact representation is a mel-spectrogram.

3. The one or more processors of claim 1, wherein the one or more Gaussian values are generated using one or more invertible layers of the one or more neural networks.

4. The one or more processors of claim 3, wherein the one or more invertible layers include an audio transform that uses dilated convolutions to generate the one or more Gaussian values.

5. The processor of claim 1, wherein the one or more neural networks are to be trained in a first direction and to generate inferences in a second direction.

6. A system, comprising:
one or more processors to use one or more circuits to:
train one or more neural networks to infer one or more speech features of one or more voice audio signals to be generated based, at least in part, on training that uses speech of the one or more voice audio signals to train the one or more neural networks to infer speech features, wherein the one or more neural networks are trained by:
converting a compact representation of a first audio signal;
generating one or more Gaussian values based, at least in part, on the converted compact representation and the first audio signal; and
training the one or more neural networks using the one or more Gaussian values; and
generate the one or more voice audio signals with the trained one or more neural networks.

7. The system of claim 6, wherein the one or more neural networks comprise one or more invertible layers.

8. The system of claim 7, wherein the one or more invertible layers include one or more audio transforms that use one or more dilated convolutions to generate the one or more Gaussian values.

9. The system of claim 6, wherein the compact representation is a mel-spectrogram.

10. The system of claim 6, wherein the first audio signal is human speech.

11. The system of claim 6, wherein the one or more neural networks are to be trained in a first direction and to generate inferences in a second direction.

12. A speech synthesis system comprising:
one or more processors comprising one or more circuits to:

train one or more neural networks to infer one or more speech features of one or more voice audio signals to be generated based, at least in part, on training that uses speech of the one or more voice audio signals to train the one or more neural networks to infer speech features, wherein the one or more neural networks are trained by:

converting a compact representation of first audio signal;

generating one or more Gaussian values based, at least in part, on the converted compact representation and the first audio signal; and training the one or more neural networks using the one or more Gaussian values; and generate the one or more voice audio signals with the trained one or more neural networks.

13. The speech synthesis system of claim 12, wherein the one or more Gaussian values are generated using one or more invertible layers of the one or more neural networks.

14. The speech synthesis system of claim 13, wherein the one or more invertible layers comprise one or more invertible coupling layers comprising an audio transform function.

15. The speech synthesis system of claim 12, wherein the compact representation is a mel-spectrogram.

16. The speech synthesis system of claim 12, wherein the one or more neural networks generate Gaussian values in a first direction and synthesizes audio signals in a second direction.

17. The speech synthesis system of claim 12, wherein the speech synthesis system comprises a vehicle.

18. One or more processors, comprising:

circuitry to:

train one or more neural networks to infer one or more speech features of one or more voice audio signals to be generated based, at least in part, on training that uses speech of the one or more voice audio signals to train the one or more neural networks to infer speech features, wherein the one or more neural networks are to be trained by at least:

converting a compact representation of a first audio signal;

generating one or more Gaussian values based, at least in part, on the converted compact representation and the first audio signal; and training the one or more neural networks using the one or more Gaussian values; and generate the one or more voice audio signals with the trained one or more neural networks.

19. The one or more processors of claim 18, wherein the compact representation is a mel-spectrogram.

20. The one or more processors of claim 18, wherein the one or more Gaussian values are generated using one or more invertible layers of the one or more neural networks.

21. The one or more processors of claim 20, wherein the one or more invertible layers include an audio transform that uses dilated convolutions to generate the one or more Gaussian values.

22. The one or more processors of claim 18, wherein the one or more neural networks are to be trained in a first direction and to inference in a second direction.

23. A system, comprising:

one or more processors comprising one or more circuits to:

train one or more neural networks to infer one or more speech features of one or more voice audio signals to be generated based, at least in part, on training that uses speech of the one or more voice audio signals to train the one or more neural networks to infer speech features, wherein the one or more neural networks are to be trained by at least:

converting a compact representation of a first audio signal;

generating one or more Gaussian values based at least in part on the converted compact representation and the first audio signal; and training the one or more neural networks using the one or more Gaussian values; and generate the one or more voice audio signals with the trained one or more neural networks.

24. The system of claim 23, wherein the one or more Gaussian values are generated using one or more invertible layers of the one or more neural networks.

25. The system of claim 24, wherein the one or more invertible layers comprise one or more invertible coupling layers comprising an audio transform function.

26. The system of claim 23, wherein the one or more neural networks generate Gaussian values in a first direction and synthesize audio signals in a second direction.

27. The system of claim 23, wherein the one or more voice audio signals encodes synthesized human speech.

28. The system of claim 23, wherein a digital representation of the first audio signal is a digital recording of human speech.

29. A computer-implemented method, comprising:

training one or more neural networks to infer one or more speech features of one or more voice audio signals to be generated based, at least in part, on one training that uses speech of the one or more voice audio signals to train the one or more neural networks to infer speech features, wherein training the one or more neural networks comprises:

converting a compact representation of a first audio signal;

generating one or more Gaussian values based, at least in part, on the converted compact representation and the first audio signal; and training the one or more neural networks using the one or more Gaussian values; and generating the one or more voice audio signals with the trained one or more neural networks.

30. The method of claim 29, wherein the compact representation is a mel-spectrogram.

31. The method of claim 29, wherein the one or more Gaussian values are generated using one or more invertible layers of the one or more neural networks.

32. The method of claim 31, wherein the one or more invertible layers include an audio transform that uses dilated convolutions to generate the one or more Gaussian values.

33. The method of claim 29, wherein the one or more neural networks are to be trained in a first direction and to inference in a second direction.

34. The method of claim 29, comprising:

training the one or more neural networks to generate one or more Gaussian values based, at least in part, on an audio signal; and synthesizing an output voice audio signal based, at least in part, on different Gaussian values.

* * * * *